United States Patent
He et al.

(10) Patent No.: US 7,318,977 B2
(45) Date of Patent: *Jan. 15, 2008

(54) PLATINUM AND TITANIUM CONTAINING ELECTROCATALYSTS

(75) Inventors: Ting He, Dublin, OH (US); Eric Rolland Kreidler, Pickerington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/429,251

(22) Filed: May 8, 2006

(65) Prior Publication Data

US 2007/0160897 A1    Jul. 12, 2007

Related U.S. Application Data (63) Continuation-in-part of application No. 11/326,350, filed on Jan. 6, 2006, and a continuation-in-part of application No. 11/370,991, filed on Mar. 9, 2006.

(51) Int. Cl.
*H01M 4/92* (2006.01)
(52) U.S. Cl. .................................. 429/44; 503/326
(58) Field of Classification Search .................. 429/40, 429/44, 30, 198.7, 127.9, 100; 48/198.7, 48/127.9; 502/100, 326, 330
See application file for complete search history.

(56) References Cited

U.S. PATENT DOCUMENTS

| | | | |
|---|---|---|---|
| 4,186,110 A | 1/1980 | Jalan et al. | |
| 4,192,907 A | 3/1980 | Jalan et al. | |
| 4,311,569 A | 1/1982 | Dempsey et al. | |
| 4,457,824 A | 7/1984 | Dempsey et al. | |
| 4,513,094 A | 4/1985 | Luczak | |
| 4,528,083 A | 7/1985 | LaConti et al. | |
| 4,707,229 A | 11/1987 | Dempsey et al. | |
| 4,781,803 A | 11/1988 | Harris et al. | |
| 5,013,618 A * | 5/1991 | Luczak | 429/44 |
| 5,068,161 A | 11/1991 | Keck et al. | |
| 2004/0177556 A1 * | 9/2004 | Hagemeyer et al. | 48/198.7 |
| 2005/0147867 A1 * | 7/2005 | Cooper et al. | 429/40 |
| 2007/0037696 A1 | 2/2007 | Gorer et al. | |

FOREIGN PATENT DOCUMENTS

EP    0 450 849 A2    10/1991

(Continued)

OTHER PUBLICATIONS

Beard, B.C. and Ross, Jr., P. N., "Characterization of a Titanium-Promoted Supported Platinum Electrocatalyst", J. Electrochem. Soc., vol. 133, No. 9, pp. 1839-1845 (Sep. 1986).

*Primary Examiner*—Patrick Joseph Ryan
*Assistant Examiner*—Monique Wills
(74) *Attorney, Agent, or Firm*—Prass & Irving, LLP; Mark E. Duell (57) ABSTRACT

The present teachings are directed toward electrocatalyst compositions of platinum, titanium, a third, fourth and possibly fifth metal for use in fuel cells. The electrocatalyst composition is composed essentially of platinum present in an atomic percentage ranging between about 30 percent and about 85 percent, titanium present in an atomic percentage ranging between about 5 percent and about 30 percent, a third metal present in an atomic percentage ranging between about 1 percent and about 30 percent, a fourth metal present in an atomic percentage ranging between about 1 percent and about 30 percent, and a possible fifth metal present in an atomic percentage ranging between about 1 percent and about 30 percent. The third metal can be at least one member selected from the group consisting of nickel, vanadium, molybdenum, copper, manganese, iron, cobalt, ruthenium, rhodium, palladium, silver, osmium, iridium and gold. The fourth and fifth metals are different from the third metal and each other and can be selected from the group consisting of scandium, vanadium, chromium, manganese, iron, nickel, copper, zinc, yttrium, zirconium, niobium, molybdenum, cadmium, tin, hafnium, tantalum and rhenium.

27 Claims, 4 Drawing Sheets

FOREIGN PATENT DOCUMENTS

| | | |
|---|---|---|
| EP | 1 526 592 A1 | 4/2005 |
| GB | 2242203 A | 9/1991 |
| JP | 4-18933 | 1/1992 |
| JP | 4018933 | 1/1992 |
| JP | 6-29027 | 7/1992 |
| JP | 6029027 | 7/1992 |
| JP | 5-135773 | 6/1993 |
| JP | 5135773 | 6/1993 |
| JP | 5-217586 | 8/1993 |
| JP | 5217586 | 8/1993 |
| JP | 6-111828 | 4/1994 |
| JP | 6111828 | 4/1994 |
| JP | 10-74523 | 3/1998 |
| JP | 1074523 | 3/1998 |
| WO | WO 2004/109829 A1 | 12/2004 |
| WO | WO 2006/021740 A1 | 3/2006 |

* cited by examiner

PLATINUM AND TITANIUM CONTAINING ELECTROCATALYSTS

CROSS-REFERENCE TO RELATED APPLICATIONS

The present application claims benefit from and is a continuation-in-part of earlier filed U.S. patent applications Ser. No. 11/326,350 filed Jan. 6, 2006, application Ser. No. 11/370,991 filed Mar. 3, 2006, and application Ser. No. 11/429,252 filed on the same date herewith, which are incorporated herein in their respective entirety by reference for all purposes.

BACKGROUND

1. Field of the Invention

The present teachings relate to electrocatalyst compositions composed essentially of platinum, titanium, a third metal, a fourth metal and a fifth metal. The platinum can be present in an atomic percentage ranging between about 30 percent and about 85 percent, titanium can be present in an atomic percentage ranging between about 5 percent and about 30 percent, the third metal can be present in an atomic percentage ranging between about 1 percent and about 30 percent, the fourth metal can be present in an atomic percentage ranging between about 1 percent and about 30 percent, the fifth metal can be present in an atomic percentage ranging between about 1 percent and about 30 percent.

The third metal can be at least one member selected from the group consisting of nickel, vanadium, molybdenum, copper, manganese, iron, cobalt, ruthenium, rhodium, palladium, silver, osmium, iridium and gold. The fourth and fifth metals are different from each other and the third metal and can each be at least one member selected from the group consisting of scandium, vanadium, chromium, manganese, iron, nickel, copper, zinc, yttrium, zirconium, niobium, molybdenum, cadmium, tin, hafnium, tantalum and rhenium.

2. Discussion of the Related Art

The desire to reduce the amount of expensive platinum group metals needed to obtain a desired level of performance for an electrocatalyst is an ever present operational parameter for the design of many devices and procedures involving electrocatalysts.

Enhancement of catalytic performance by combining platinum with various less expensive metals is one of the possible avenues to reduce the amount of platinum required, or increase the efficiency of the catalyzed reaction, or both. One application of interest for Pt-based electrocatalyst is, for instance, the cathode reaction of a typical proton exchange membrane fuel cell ("PEMFC") which can utilize an electrode containing a Pt-based electrocatalyst to catalyze the oxygen reduction reaction.

A need exists for electrocatalyst compositions and thin film fuel cell electrocatalysts that reduce the amount of platinum needed to achieve a desired performance level.

SUMMARY

The present teachings satisfy the need for electrocatalyst compositions with lower platinum amounts, particularly for fuel cell electrocatalysts, and especially for thin film fuel cell electrocatalysts.

An electrocatalyst composition including a metal composition composed essentially of platinum, titanium, a third metal, a fourth metal and a fifth metal. The composition can contain platinum present in an atomic percentage ranging between about 30 percent and about 85 percent, titanium present in an atomic percentage ranging between about 5 percent and about 30 percent, the third metal present in an atomic percentage ranging between about 1 percent and about 30 percent, the fourth metal present in an atomic percentage ranging between about 1 percent and about 30 percent, and the fifth metal present in an atomic percentage ranging between about 1 percent and about 30 percent. The third metal can be at least one member selected from the group consisting of nickel, vanadium, molybdenum, copper, manganese, iron, cobalt, ruthenium, rhodium, palladium, silver, osmium, iridium and gold. The fourth metal is different from the third metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium. The fifth metal is different from both the third metal and the fourth metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium.

A electrocatalyst comprising a metal composition containing essentially platinum, titanium, a third metal and a fourth metal is also taught by the present disclosure. The metal composition can contain platinum present in an atomic percentage ranging between about 30 percent and about 85 percent, titanium present in an atomic percentage ranging between about 5 percent and about 30 percent, the third metal present in an atomic percentage ranging between about 1 percent and about 30 percent and the fourth metal present in an atomic percentage ranging between about 1 percent and about 30 percent. The third metal can be at least one member selected from the group consisting of nickel, vanadium, molybdenum, copper, manganese, iron, cobalt, ruthenium, rhodium, palladium, silver, osmium, iridium and gold. The fourth metal is different from the third metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium.

The present teachings further include a fuel cell assembly comprising at least an electrocatalyst, a membrane, and at least one electrode. The electrocatalyst comprises a composition composed essentially of platinum, titanium, a third metal, a fourth metal and a fifth metal is also taught by the present disclosure. The metal composition can contain platinum present in an atomic percentage ranging between about 30 percent and about 85 percent, titanium present in an atomic percentage ranging between about 5 percent and about 30 percent, the third metal present in an atomic percentage ranging between about 1 percent and about 30 percent, the fourth metal present in an atomic percentage ranging between about 1 percent and about 30 percent, and the fifth metal present in an atomic percentage ranging between about 1 percent and about 30 percent. The third metal can be at least one member selected from the group consisting of nickel, vanadium, molybdenum, copper, manganese, iron, cobalt, ruthenium, rhodium, palladium, silver, osmium, iridium and gold. The fourth metal is different from the third metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium. The fifth metal is different from both the third metal and the fourth metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium. The electrocatalyst can be a thin film electrocatalyst which can also be a supported electrocatalyst which can comprise a powder composition composed essentially of platinum, titanium, a third metal, a fourth metal and a fifth metal supported on a high surface area support material. The electrocatalyst can, in some alternative embodiments, be a supported nanoparticle-containing powder.

Also included in the present teachings is an electrocatalyst composition including a metal composition composed essentially of platinum, titanium, cobalt and palladium. The composition can contain platinum present in an atomic percentage ranging between about 30 percent and about 60 percent, titanium present in an atomic percentage ranging between about 5 percent and about 20 percent, cobalt present in an atomic percentage ranging between about 1 percent and about 20 percent, and palladium present in an atomic percentage ranging between about 15 percent and about 30 percent.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

The present teachings relate to an electrocatalyst composition including a metal composition composed essentially of platinum, titanium, a third metal, a fourth metal and, optionally, a fifth metal. The composition can contain platinum present in an atomic percentage ranging between about 30 percent and about 85 percent, titanium present in an atomic percentage ranging between about 5 percent and about 30 percent, and the third metal present in an atomic percentage ranging between about 1 percent and about 30 percent. The third metal is at least one member selected from the group consisting of nickel, vanadium, molybdenum, copper, manganese, iron, cobalt, ruthenium, rhodium, palladium, silver, osmium, iridium and gold. The fourth metal can be present in an atomic percentage ranging between about 1 percent and about 30 percent, and the fifth metal can be present in an atomic percentage ranging between about 1 percent and about 30 percent. The fourth metal is different from the third metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium. When the optional fifth metal is present in the electrocatalyst composition, it is different from both the third metal and the fourth metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium.

An additional embodiment of the electrocatalyst composition can have platinum present in an atomic percentage ranging between about 60 percent and about 70 percent, titanium present in an atomic percentage ranging between about 10 percent and about 30 percent, and the third metal can be nickel present in an atomic percentage ranging between about 1 percent and about 20 percent. Further examples of the present teachings include an electrocatalyst composition with vanadium as the third metal and present in an atomic percentage ranging between about 1 percent and about 20 percent, or an alternative composition with molybdenum as the third metal and present in an atomic percentage ranging between about 1 percent and about 20 percent.

Yet another example of the electrocatalyst composition can have platinum present in an atomic percentage ranging between about 55 percent and about 70 percent, titanium present in an atomic percentage ranging between about 15 percent and about 20 percent, and the third metal is copper and present in an atomic percentage ranging between about 10 percent and about 25 percent.

A further additional embodiment of the electrocatalyst composition can have platinum present in an atomic percentage ranging between about 60 percent and about 80 percent, titanium present in an atomic percentage ranging between about 10 percent and about 20 percent, and manganese as the third metal and present in an atomic percentage ranging between about 10 percent and about 25 percent.

Yet another example of the electrocatalyst composition can have platinum present in an atomic percentage ranging between about 60 percent and about 75 percent, titanium present in an atomic percentage ranging between about 10 percent and about 20 percent, with iron present as the third metal in an atomic percentage ranging between about 10 percent and about 25 percent.

A still further embodiment of the electrocatalyst composition can include platinum present in an atomic percentage ranging between about 60 percent and about 75 percent, titanium present in an atomic percentage ranging between about 5 percent and about 25 percent, with cobalt present as the third metal in an atomic percentage ranging between about 10 percent and about 25 percent.

In another embodiment of the electrocatalyst composition, palladium can be the third metal present in an atomic percentage ranging between about 10 percent and about 30 percent, with platinum present in an atomic percentage ranging between about 50 percent and about 65 percent, and titanium present in an atomic percentage ranging between about 15 percent and about 25 percent.

An additional embodiment of the present teachings is directed to an electrocatalyst composition having a metal composition consisting essentially of platinum, titanium, cobalt and palladium. The platinum can be present in an atomic percentage ranging between about 30 percent and about 60 percent, titanium present in an atomic percentage ranging between about 5 percent and about 20 percent, cobalt present in an atomic percentage ranging between about 4 percent and about 20 percent, and palladium present in an atomic percentage ranging between about 15 percent and about 30 percent.

Another electrocatalyst composition embodiment can include platinum present in an atomic percentage ranging between about 40 percent and about 55 percent, titanium present in an atomic percentage ranging between about 13 percent and about 20 percent, cobalt present in an atomic percentage ranging between about 9 percent and about 16 percent, and palladium present in an atomic percentage ranging between about 18 percent and about 26 percent.

The electrocatalyst compositions can be in the form of a supported nanoparticle-containing powder. The nanoparticles present in the supported powder can range in size from about 0.5 nm to about 100 nm, and can be composed of platinum, titanium, a third metal, a fourth metal and a fifth metal.

The electrocatalyst compositions can be in the form of a thin film. The thin film electrocatalyst can be a film ranging in thickness from nanometers to micrometers thick and can be prepared by physical vapor deposition, electrochemical plating, or ink coating of the desired components onto a suitable substrate. One possible means of producing the desired thin film is physical vapor deposition. Physical vapor deposition refers to the deposition of the components from component vapors generated through, for instance, heat, plasma, and electron beams. The deposition of the components, in this case, platinum, titanium and additional metals, can occur simultaneously, or sequentially. A suitable preparation method is described in U.S. Patent Application Publication No. 2005-0150760 A1 published Jul. 14, 2005.

The thin film electrocatalyst can be the cathode of a PEMFC and can drive the oxygen reduction reaction of the PEMFC.

Also provided by the present teachings is a fuel cell electrocatalyst composed from an electrocatalyst composition, where the composition is composed essentially of platinum, titanium, a third metal, a fourth metal and, optionally, a fifth metal. The composition can contain platinum present in an atomic percentage ranging between about 30 percent and about 85 percent, titanium present in an atomic percentage ranging between about 5 percent and about 30 percent, and the third metal present in an atomic percentage ranging between about 1 percent and about 30 percent. The third metal is at least one member selected from the group consisting of nickel, vanadium, molybdenum, copper, manganese, iron, cobalt, ruthenium, rhodium, palladium, silver, osmium, iridium and gold. The fourth metal can be present in an atomic percentage ranging between about 1 percent and about 30 percent, and the fifth metal can be present in an atomic percentage ranging between about 1 percent and about 30 percent. The fourth metal is different from the third metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium. When the optional fifth metal is present in the electrocatalyst composition, it is different from both the third metal and the fourth metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium.

An additional embodiment of the fuel cell electrocatalyst can have platinum present in an atomic percentage ranging between about 60 percent and about 70 percent, titanium present in an atomic percentage ranging between about 10 percent and about 30 percent, and the third metal can be nickel present in an atomic percentage ranging between about 1 percent and about 20 percent. Further examples of the present teachings include a fuel cell electrocatalyst with vanadium as the third metal and present in an atomic percentage ranging between about 1 percent and about 20 percent, or an alternative fuel cell electrocatalyst with molybdenum as the third metal and present in an atomic percentage ranging between about 1 percent and about 20 percent.

Yet another example of the fuel cell electrocatalyst can have platinum present in an atomic percentage ranging between about 55 percent and about 70 percent, titanium present in an atomic percentage ranging between about 15 percent and about 20 percent, and the third metal is copper and present in an atomic percentage ranging between about 10 percent and about 25 percent.

A further additional embodiment of the fuel cell electrocatalyst can have platinum present in an atomic percentage ranging between about 60 percent and about 80 percent, titanium present in an atomic percentage ranging between about 10 percent and about 20 percent, and manganese as the third metal and present in an atomic percentage ranging between about 10 percent and about 25 percent.

Yet another example of the fuel cell electrocatalyst can have platinum present in an atomic percentage ranging between about 60 percent and about 75 percent, titanium present in an atomic percentage ranging between about 10 percent and about 20 percent, with iron present as the third metal in an atomic percentage ranging between about 10 percent and about 25 percent.

A still further embodiment of the fuel cell electrocatalyst can include platinum present in an atomic percentage ranging between about 60 percent and about 75 percent, titanium present in an atomic percentage ranging between about 5 percent and about 25 percent, with cobalt present as the third metal in an atomic percentage ranging between about 10 percent and about 25 percent.

In another embodiment of the fuel cell electrocatalyst, palladium can be the third metal present in an atomic percentage ranging between about 10 percent and about 30 percent, with platinum present in an atomic percentage ranging between about 50 percent and about 65 percent, and titanium present in an atomic percentage ranging between about 15 percent and about 25 percent.

The present fuel cell assembly can also utilize an electrocatalyst composition consisting essentially of platinum present in an atomic percentage ranging between about 30 percent and about 60 percent, titanium present in an atomic percentage ranging between about 5 percent and about 20 percent, cobalt present in an atomic percentage ranging between about 4 percent and about 20 percent, and palladium present in an atomic percentage ranging between about 15 percent and about 30 percent. In another embodiment of the fuel cell assembly, the electrocatalyst composition can consist of platinum present in an atomic percentage ranging between about 40 percent and about 55 percent, titanium present in an atomic percentage ranging between about 13 percent and about 20 percent, cobalt present in an atomic percentage ranging between about 9 percent and about 16 percent, and palladium present in an atomic percentage ranging between about 18 percent and about 26 percent.

The fuel cell electrocatalyst can be a supported nanoparticle-containing powder. The nanoparticles present in the supported powder can range in size from about 0.5 nm to about 100 nm, and can be composed of nanoparticles of the above described electrocatalyst composition.

The fuel cell electrocatalyst can be in various forms, including, for example, a thin film, a supported powder, or a supported nanoparticle-containing powder. The powder electrocatalyst and nanoparticle-containing fuel cell electrocatalyst can be supported on a support, such as a high surface area carbon, like carbon black, for instance, or can be unsupported. High surface area electrically conductive support material can also be utilized as a support for the fuel cell electrocatalyst.

The fuel cell electrocatalyst can be prepared by, for example, physical vapor deposition. The physical vapor can be plasma generated by a suitable means, for example, plasma guns. Further examples of deposition methods include, for instance, ion plating, ion implantation, evaporation, and laser surface alloying.

The fuel cell electrocatalyst can be prepared by, for example, simultaneous deposition of the platinum metal, the titanium metal and the additional metals. Alternatively, the fuel cell electrocatalyst as a thin film can be prepared by sequential deposition of the various metals, or by various combinations of simultaneous and sequential deposition of the various metals present in the electrocatalyst composition.

A fuel cell assembly including a membrane, a thin film, or supported, electrocatalyst, and an electrode which can be different from the thin film electrocatalyst is provided. The thin film, or supported, electrocatalyst can be composed of a metal composition composed essentially of platinum, titanium, a third metal, a fourth metal and, optionally, a fifth metal. The composition can contain platinum present in an atomic percentage ranging between about 30 percent and about 85 percent, titanium present in an atomic percentage ranging between about 5 percent and about 30 percent, and the third metal present in an atomic percentage ranging between about 1 percent and about 30 percent. The third metal is at least one member selected from the group consisting of nickel, vanadium, molybdenum, copper, manganese, iron, cobalt, ruthenium, rhodium, palladium, silver, osmium, iridium and gold. The fourth metal can be present in an atomic percentage ranging between about 1 percent and about 30 percent, and the fifth metal can be present in an atomic percentage ranging between about 1 percent and about 30 percent. The fourth metal is different from the third metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium. When the optional fifth metal is present in the electrocatalyst composition it is different from both the third metal and the fourth metal and can be at least one member selected from the group consisting of scandium, vanadium, chromium, manganese, iron, nickel, copper, zinc, yttrium, zirconium, niobium, molybdenum, cadmium, tin, hafnium, tantalum and rhenium.

In additional embodiments of the present fuel cell assembly, the electrocatalyst composition can have platinum present in an atomic percentage ranging between about 60 percent and about 70 percent, titanium present in an atomic percentage ranging between about 10 percent and about 30 percent, and the third metal can be nickel present in an atomic percentage ranging between about 1 percent and about 20 percent. Further examples of the present teachings include fuel cell assembly including an electrocatalyst composition with vanadium as the third metal and present in an atomic percentage ranging between about 1 percent and about 20 percent, or an alternative composition with molybdenum as the third metal and present in an atomic percentage ranging between about 1 percent and about 20 percent.

Yet another example of the present fuel cell assembly, the electrocatalyst composition can include platinum present in an atomic percentage ranging between about 55 percent and about 70 percent, titanium present in an atomic percentage ranging between about 15 percent and about 20 percent, and the third metal is copper and present in an atomic percentage ranging between about 10 percent and about 25 percent.

A further additional embodiment of the present fuel cell assembly, the electrocatalyst composition can consist of platinum present in an atomic percentage ranging between about 60 percent and about 80 percent, titanium present in an atomic percentage ranging between about 10 percent and about 20 percent, and manganese as the third metal and present in an atomic percentage ranging between about 10 percent and about 25 percent.

Yet another example of the present fuel cell assembly, the electrocatalyst composition can have platinum present in an atomic percentage ranging between about 60 percent and about 75 percent, titanium present in an atomic percentage ranging between about 10 percent and about 20 percent, with iron present as the third metal in an atomic percentage ranging between about 10 percent and about 25 percent.

A still further embodiment of the fuel cell assembly can include platinum present in an atomic percentage ranging between about 60 percent and about 75 percent, titanium present in an atomic percentage ranging between about 5 percent and about 25 percent, with cobalt present as the third metal in an atomic percentage ranging between about 10 percent and about 25 percent.

In another embodiment of the fuel cell assembly, palladium can be the third metal present in an atomic percentage ranging between about 10 percent and about 30 percent, with platinum present in an atomic percentage ranging between about 50 percent and about 65 percent, and titanium present in an atomic percentage ranging between about 15 percent and about 25 percent.

The supported electrocatalyst can be composed of a powder composition. The powder composition can be prepared by any suitable preparation method, for instance, wet chemical methods. The powder can be supported on a suitable high surface area support. The high surface area support can be, for instance, carbon or alumina. High surface area refers to supports with surface areas of at least about 100 $m^2/g$. The thin film electrocatalyst can be the cathode of a PEMFC and can drive the oxygen reduction reaction of the PEMFC.

A thin film can be a film ranging in thickness from nanometers to micrometers thick and can be prepared by physical vapor deposition, electrochemical plating, or ink coating of the desired components onto a suitable substrate. One possible means of producing the desired thin film is physical vapor deposition. Physical vapor deposition refers to the deposition of the components from component vapors generated through, for instance, heat, plasma, and electron beams. The deposition of the components, in this case, platinum, titanium and additional metals, can occur simultaneously, or sequentially. A suitable preparation method is described in U.S. Patent Application Publication No. 2005-0150760 A1 published Jul. 14, 2005.

For all of the compositions taught herein, the concentrations of the metals present therein can be varied to optimize the performance of the electrocatalyst. The electrocatalyst composition can be varied dependent on such factors as the operating environment and performance requirements. The electrocatalyst compositions can, in some embodiments, include platinum present in an atomic percentage ranging between a low concentration selected from about 30 percent, 40 percent, 50 percent, 55 percent and 60 percent and a high concentration selected from about 55 percent, 60 percent, 65 percent, 70 percent, 75 percent, 80 percent and 85 percent. The electrocatalyst compositions can, in some embodiments, include titanium present in an atomic percentage ranging between a low concentration selected from about 5 percent, 10 percent, 13 percent and 15 percent to a high concentration selected from about 20 percent, 25 percent and 30 percent. A third metal can be present in the electrocatalyst composition, in some embodiments, at a low concentration selected from about 1 percent and 10 percent to a high concentration selected from about 20 percent, 25 percent and 30 percent. The third metal can be selected from the group consisting of nickel, vanadium, molybdenum, copper, manganese, iron, cobalt, ruthenium, rhodium, palladium, silver, osmium, iridium and gold. The fourth and optional fifth metals can be present in atomic percentages ranging from a low concentration of about 1 percent to a high concentration of about 30 percent. The fourth and optional fifth metals can be selected from the group consisting of scandium, vanadium, chromium, manganese, iron, nickel, copper, zinc, yttrium, zirconium, niobium, molybdenum, cadmium, tin, hafnium, tantalum and rhenium. The fourth and optional fifth metals are different from the third metal and from one another. Cobalt can be present in an atomic percentage ranging from a low concentration selected from about 1 percent, 4 percent, 9 percent, 10 percent and 15 percent to a high concentration selected from about 16 percent, 20 percent, 25 percent and 30 percent. Palladium can be present in the electrocatalyst composition in an atomic percentage ranging from a low concentration selected from about 1 percent, 10 percent, 15 percent and 18 percent to a high concentration selected from about 20 percent, 25 percent, 26 percent and 30 percent.

The metals in the electrocatalyst compositions can be present in any of several possible oxidation states and structures. The metal oxidation state and structure depend on a number of factors, including, for example, the chemical formulation, heat treatment, and any exposure to hydrogen and/or oxygen-containing environments. The possible metal structures can include, for example, alloys, mixed oxides, hydrous oxides, mixed hydrides, bronzes, perovskites, and so forth. The structure of any metals on the surface of the electrocatalyst can differ from, or can be the same as, the structure of metals located within the bulk of the electrocatalyst. The concentration of any metals on the surface of the electrocatalyst can differ from, or can be the same as, the concentration of metals located within the bulk of the electrocatalyst.

The metal components of the composition can be present at or on the surface of the electrocatalyst. The metal components, both oxidized and metallic, can be located anywhere in the structure of an electrocatalyst composition according to the present teachings.

The atomic percentages set forth herein were determined by EDX analysis of the thin film electrocatalyst compositions after evaluation by rotating disc electrode as detailed in the Example section below.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the present teachings are exemplary and should not be construed as limiting the scope of the present teachings.

EXAMPLES

Thin film samples having compositions of varying ratios of platinum, titanium and any additional metals were prepared by physical vapor deposition of plasma generated metal vapors. A suitable preparation method is described in U.S. Patent Application Publication No. 2005-0150760 A1 published Jul. 14, 2005.

The activity levels for the oxygen reduction reaction of the platinum, titanium and the additional metal-containing electrocatalysts were electrochemically screened using a hydrodynamic rotating disc electrode (RDE) apparatus, which is capable of screening numerous material compositions simultaneously. A suitable screening method is described in pending U.S. Patent Application Publication No. 2005-0103645 A1 published May 19, 2005.

Thin film samples were coated onto 5 mm diameter glassy carbon electrodes. Following electrochemical cleaning, the samples were then used as the working electrodes in oxygen reduction reaction cells, and the results are presented in Table 1 below.

In Table 1, the atomic percentages of the platinum, titanium and the additional metal components are tabulated. The shifts of half wave potential ($\Delta E_{1/2}$) in mV are presented, along with the platinum mass-fraction-based activity relative to pure platinum thin film (R-Act) at both 0.7 V and 0.8 V for each sample, in Table 1.

Figure 1:
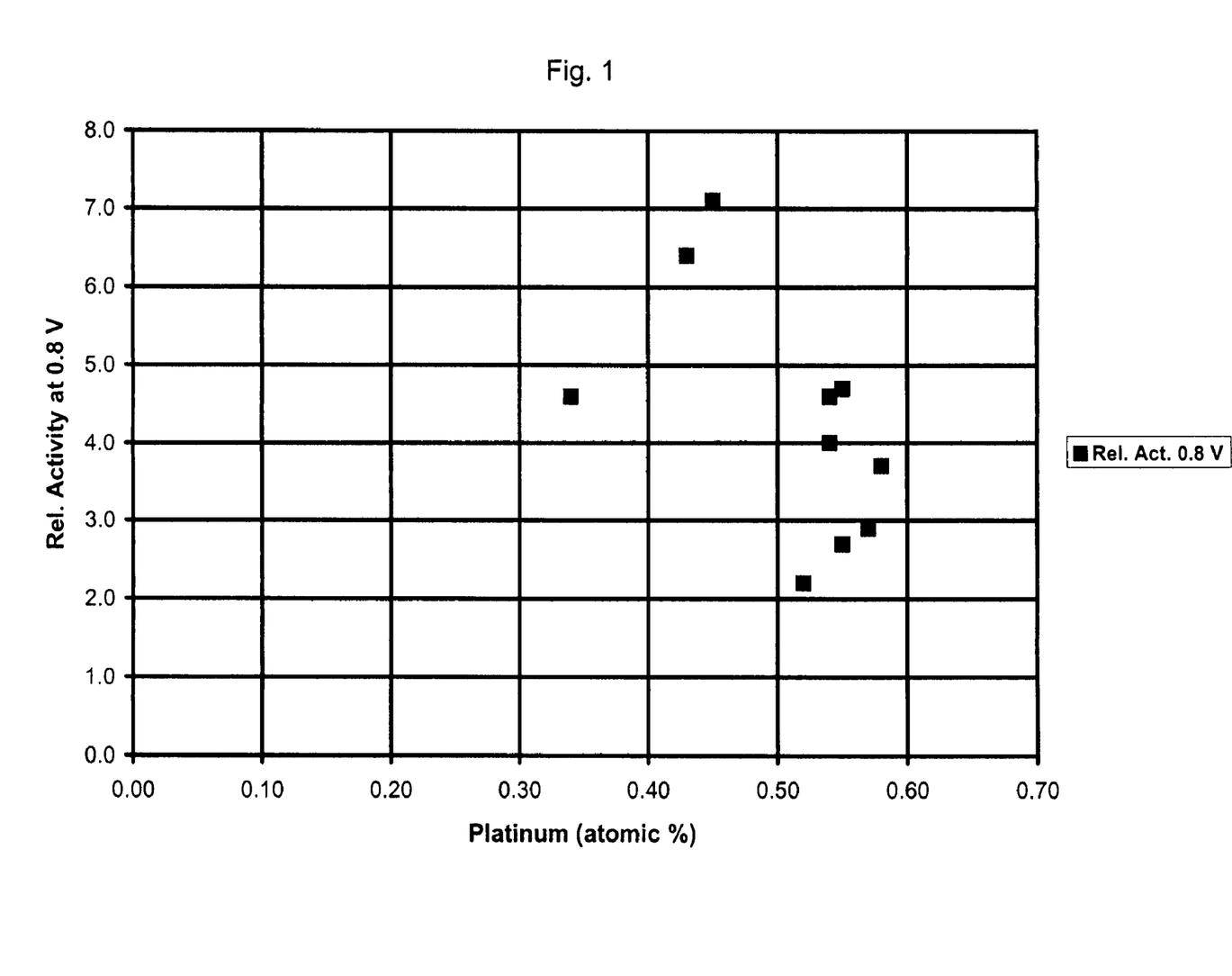
FIG. 1. illustrates the activity relative to a pure platinum thin film at 0.8 V for each of the samples versus the atomic percentage of platinum.
Figure 2:
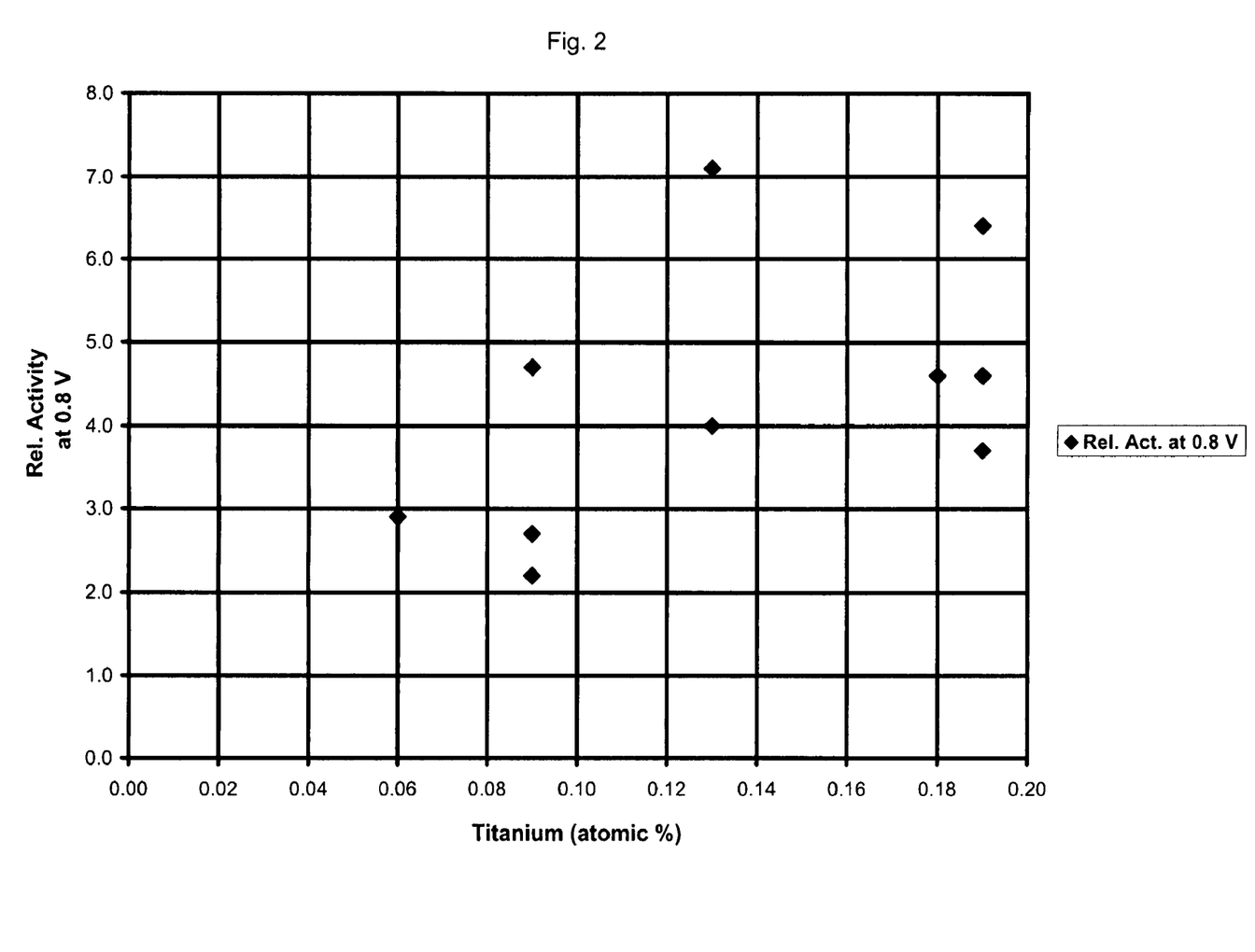
FIG. 2. illustrates the activity relative to a pure platinum thin film at 0.8 V for each of the samples versus the atomic percentage of titanium.
Figure 3:
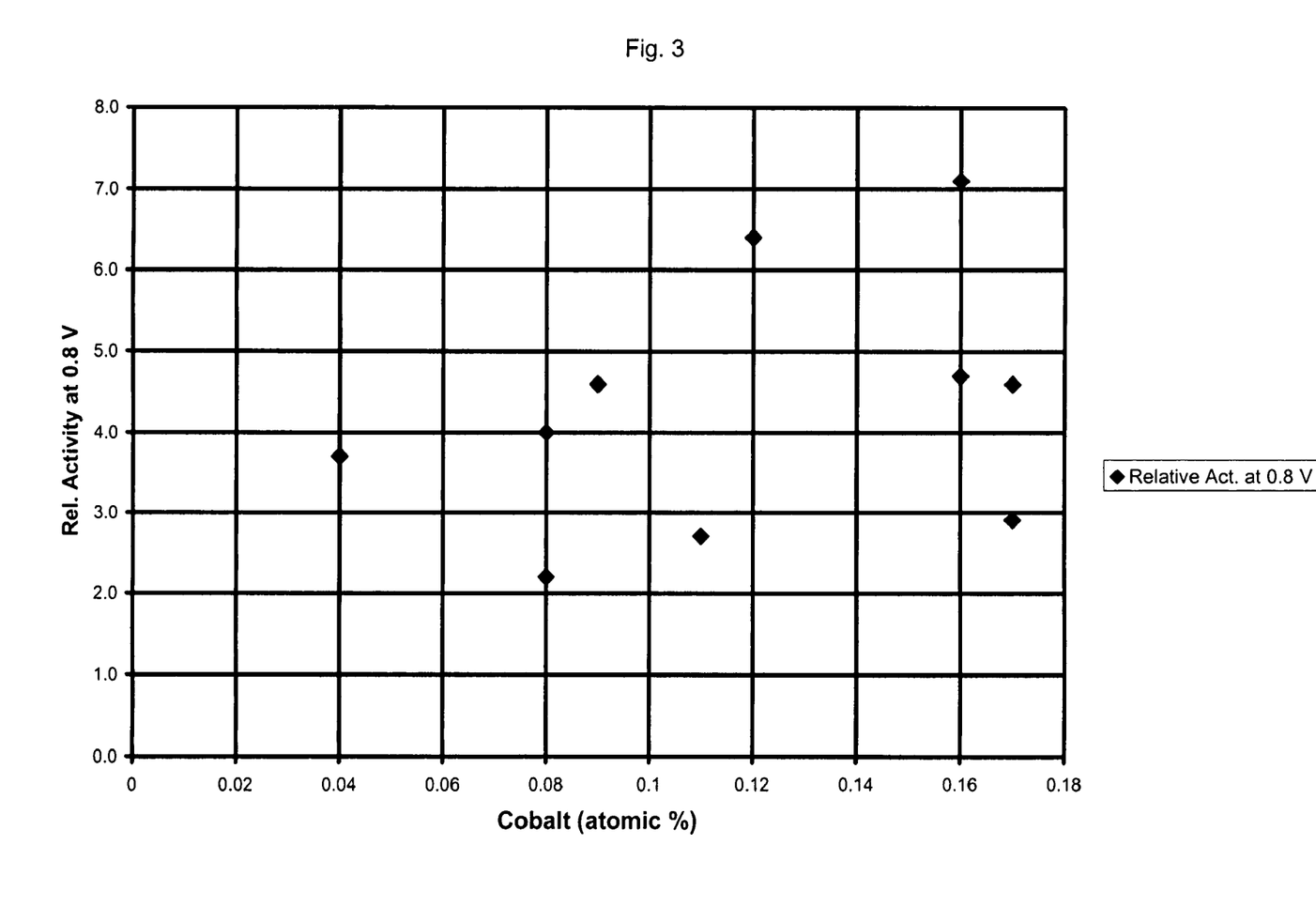
FIG. 3. illustrates the activity relative to a pure platinum thin film at 0.8 V for each of the samples versus the atomic percentage of cobalt.
Figure 4:
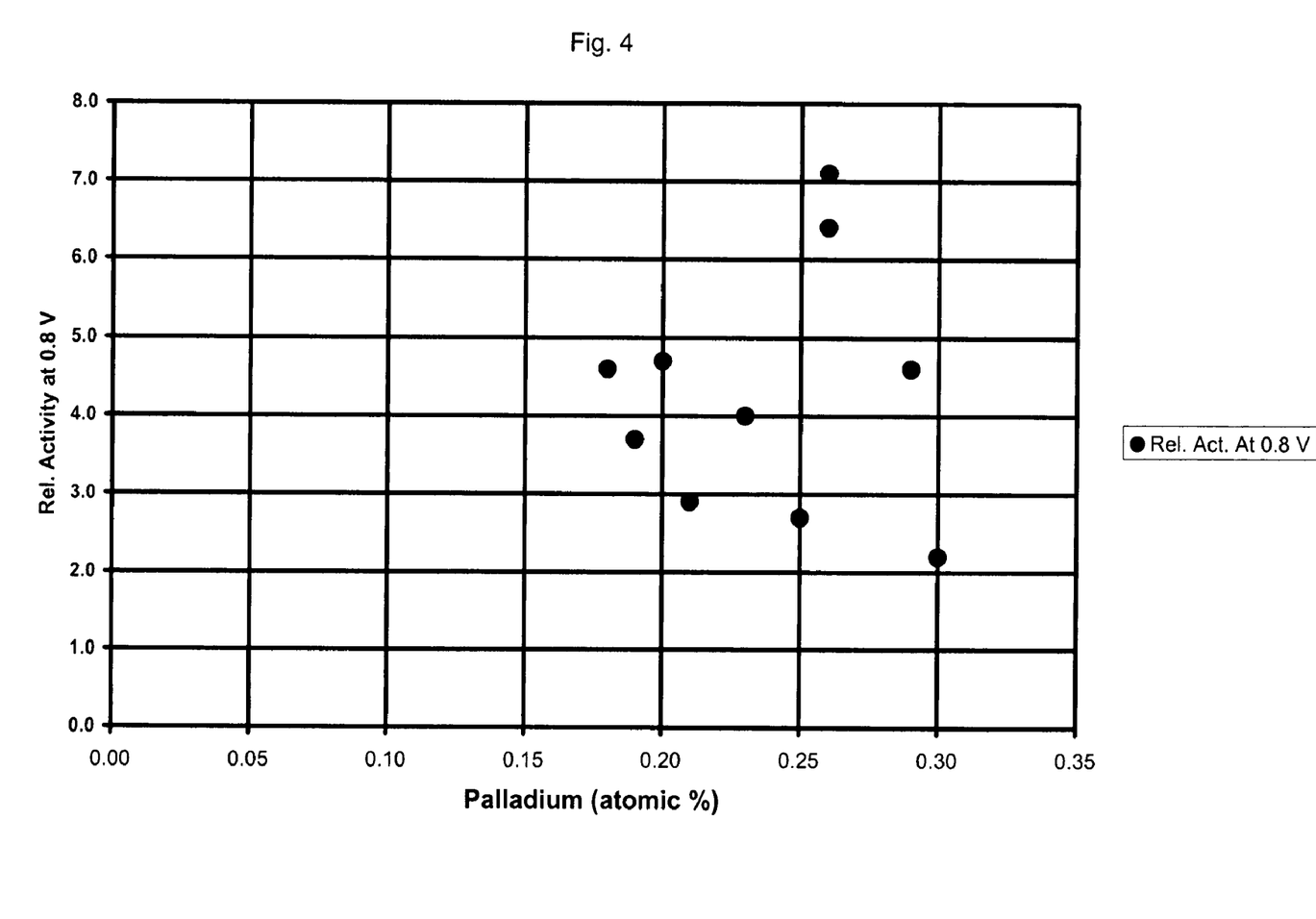
FIG. 4. illustrates the activity relative to a pure platinum thin film at 0.8 V for each of the samples versus the atomic percentage of palladium.

FIGS. 1 through 4 present the activity relative to a pure platinum thin film at 0.8 V for each of the samples versus the atomic percentage of platinum, titanium, cobalt and palladium, respectively.

TABLE 1

| COMPOSITION | | | | RELATIVE ACTIVITY | | |
|---|---|---|---|---|---|---|
| Pt (at %) | Ti (at %) | Co (at %) | Pd (at %) | $\Delta E_{1/2}$ (mV) | R-Act (0.7 V) | R-Act (0.8 V) |
| 0.34 | 0.19 | 0.17 | 0.29 | 52.8 | 4.6 | 4.6 |
| 0.43 | 0.19 | 0.12 | 0.26 | 73.5 | 5.2 | 6.4 |
| 0.45 | 0.13 | 0.16 | 0.26 | 80.1 | 5.8 | 7.1 |
| 0.52 | 0.09 | 0.08 | 0.30 | 17.8 | 1.7 | 2.2 |
| 0.54 | 0.13 | 0.08 | 0.23 | 56.1 | 3.4 | 4.0 |
| 0.54 | 0.18 | 0.09 | 0.18 | 64.8 | 3.9 | 4.6 |
| 0.55 | 0.09 | 0.11 | 0.25 | 27.4 | 1.8 | 2.7 |
| 0.55 | 0.09 | 0.16 | 0.20 | 58.7 | 3.1 | 4.7 |
| 0.57 | 0.06 | 0.17 | 0.21 | 34.9 | 2.3 | 2.9 |
| 0.58 | 0.19 | 0.04 | 0.19 | 55.3 | 3.3 | 3.7 |

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What is claimed is:

1. An electrocatalyst composition for a cathode consisting essentially of:
a cathode comprising a metal composition consisting essentially of platinum, titanium, a third metal and a fourth metal,
wherein platinum is present in an atomic percentage ranging between about 30 percent and about 85 percent, titanium is present in an atomic percentage ranging between about 5 percent and about 30 percent, the third metal is present in an atomic percentage ranging between about 1 percent and about 30 percent and the fourth metal is present in an atomic percentage ranging between about 1 percent and about 30 percent,
wherein the third metal is at least one member selected from the group consisting of nickel, vanadium, copper, manganese, cobalt, ruthenium, palladium, silver, osmium, iridium and gold, and
the fourth metal is different from the third metal and is at least one member selected from the group consisting of scandium, vanadium, chromium, manganese, nickel, copper, zinc, yttrium, zirconium, niobium, cadmium, tin, hafnium, tantalum and rhenium.

2. The electrocatalyst composition according to claim 1, wherein the metal composition farther consists essentially of a fifth metal present in an atomic percentage ranging between about 1 percent and about 30 percent, and
wherein the fifth metal is at least one member selected from the group consisting of scandium, vanadium, chromium, manganese, nickel, copper, zinc, yttrium, zirconium, niobium, cadmium, tin, hafnium, tantalum and rhenium, and
wherein the third, fourth and fifth metals are different metals.

3. The electrocatalyst composition according to claim 2, wherein platinum is present in an atomic percentage ranging between about 60 percent and about 70 percent, titanium is present in an atomic percentage ranging between about 10 percent and about 30 percent, and the third metal is nickel and is present in an atomic percentage ranging between about 1 percent and about 20 percent.

4. The electrocatalyst composition according to claim 3, wherein the third metal is vanadium and is present in an atomic percentage ranging between about 1 percent and about 20 percent.

5. The electrocatalyst composition according to claim 2, wherein platinum is present in an atomic percentage ranging between about 55 percent and about 70 percent, titanium is present in an atomic percentage ranging between about 15 percent and about 20 percent, and the third metal is copper and is present in an atomic percentage ranging between about 10 percent and about 25 percent.

6. The electrocatalyst composition according to claim 2, wherein platinum is present in an atomic percentage ranging between about 60 percent and about 80 percent, titanium is present in an atomic percentage ranging between about 10 percent and about 20 percent, and the third metal is manganese and is present in an atomic percentage ranging between about 10 percent and about 25 percent.

7. The electrocatalyst composition according to claim 2, wherein platinum is present in an atomic percentage ranging between about 60 percent and about 75 percent, titanium is present in an atomic percentage ranging between about 5 percent and about 25 percent, and the third metal is cobalt and is present in an atomic percentage ranging between about 10 percent and about 25 percent.

8. The electrocatalyst composition according to claim 2, wherein platinum is present in an atomic percentage ranging between about 50 percent and about 65 percent, titanium is present in an atomic percentage ranging between about 15 percent and about 25 percent, and the third metal is palladium and is present in an atomic percentage ranging between about 10 percent and about 30 percent.

9. A thin film electrocatalyst consisting of the electrocatalyst composition according to claim 1.

10. An electrocatalyst composition for a cathode consisting essentially of:
a cathode comprising a metal composition consisting essentially of platinum, titanium, a third metal, a fourth metal and a fifth metal,
wherein platinum is present in an atomic percentage ranging between about 30 percent and about 85 percent, titanium is present in an atomic percentage ranging between about 5 percent and about 30 percent, the third metal is present in an atomic percentage ranging between about 1 percent and about 30 percent, the fourth metal is present in an atomic percentage ranging between about 1 percent and about 30 percent, the fifth metal is present in an atomic percentage ranging between about 1 percent and about 30 percent, and
wherein the third metal is at least one member selected from the group consisting of nickel, vanadium, copper, manganese, cobalt, ruthenium, palladium, silver, osmium, iridium and gold,
the fourth metal is different from the third metal and is at least one member selected from the group consisting of scandium, vanadium, chromium, manganese, nickel, copper, zinc, yttrium, zirconium, niobium, cadmium, tin, hafnium, tantalum and rhenium, and
the fifth metal is different from both the third metal and the fourth metal and is at least one member selected from the group consisting of scandium, vanadium, chromium, manganese, nickel, copper, zinc, yttrium, zirconium, niobium, cadmium, tin, hafnium, tantalum and rhenium.

11. The electrocatalyst composition according to claim 10, wherein platinum is present in an atomic percentage ranging between about 60 percent and about 70 percent, titanium is present in an atomic percentage ranging between about 10 percent and about 30 percent, and the third metal is nickel and is present in an atomic percentage ranging between about 1 percent and about 20 percent.

12. The electrocatalyst composition according to claim 11, wherein the third metal is vanadium and is present in an atomic percentage ranging between about 1 percent and about 20 percent.

13. The electrocatalyst composition according to claim 10, wherein platinum is present in an atomic percentage ranging between about 55 percent and about 70 percent, titanium is present in an atomic percentage ranging between about 15 percent and about 20 percent, and the third metal is copper and is present in an atomic percentage ranging between about 10 percent and about 25 percent.

14. The electrocatalyst composition according to claim 10, wherein platinum is present in an atomic percentage ranging between about 60 percent and about 80 percent, titanium is present in an atomic percentage ranging between about 10 percent and about 20 percent, and the third metal is manganese and is present in an atomic percentage ranging between about 10 percent and about 25 percent.

15. The electrocatalyst composition according to claim 10, wherein platinum is present in an atomic percentage ranging between about 60 percent and about 75 percent, titanium is present in an atomic percentage ranging between about 5 percent and about 25 percent, and the third metal is cobalt and is present in an atomic percentage ranging between about 10 percent and about 25 percent.

16. The electrocatalyst composition according to claim 10, wherein platinum is present in an atomic percentage ranging between about 50 percent and about 65 percent, titanium is present in an atomic percentage ranging between about 15 percent and about 25 percent, and the third metal is palladium and is present in an atomic percentage ranging between about 10 percent and about 30 percent.

17. A thin film electrocatalyst consisting of the electrocatalyst composition according to claim 10.

18. An electrocatalyst composition consisting essentially of:
a metal composition consisting essentially of platinum, titanium, cobalt and palladium,
wherein platinum is present in an atomic percentage ranging between about 30 percent and about 60 percent, titanium is present in an atomic percentage ranging between about 5 percent and about 20 percent, cobalt is present in an atomic percentage ranging between about 4 percent and about 20 percent, and palladium is present in an atomic percentage ranging between about 15 percent and about 30 percent.

19. The electrocatalyst composition according to claim 18, wherein the metal composition consists essentially of platinum present in an atomic percentage ranging between about 40 percent and about 55 percent, titanium present in an atomic percentage ranging between about 13 percent and about 20 percent, cobalt present in an atomic percentage ranging between about 9 percent and about 16 percent, and palladium present in an atomic percentage ranging between about 18 percent and about 26 percent.

20. A fuel cell assembly comprising:
an electrocatalyst,
a membrane, and
an electrode;
wherein the electrocatalyst comprises a cathode comprising a metal composition consisting essentially of platinum, titanium, a third metal, a fourth metal and a fifth metal,
wherein platinum is present in an atomic percentage ranging between about 30 percent and about 85 percent, titanium is present in an atomic percentage ranging between about 5 percent and about 30 percent, the third metal is present in an atomic percentage ranging between about 1 percent and about 30 percent, the fourth metal is present in an atomic percentage ranging between about 1 percent and about 30 percent, the fifth metal is present in an atomic percentage ranging between about 1 percent and about 30 percent, and
wherein the third metal is at least one member selected from the group consisting of nickel, vanadium, copper, manganese, cobalt, ruthenium, palladium, silver, osmium, iridium and gold,
the fourth metal is different from the third metal and is at least one member selected from the group consisting of scandium, vanadium, chromium, manganese, nickel, copper, zinc, yttrium, zirconium, niobium, cadmium, tin, hafnium, tantalum and rhenium, and
the fifth metal is different from both the third metal and the fourth metal and is at least one member selected from the group consisting of scandium, vanadium, chromium, manganese, nickel, copper, zinc, yttrium, zirconium, niobium, cadmium, tin, hafnium, tantalum and rhenium.

21. The fuel cell assembly according to claim 20, wherein platinum is present in an atomic percentage ranging between about 60 percent and about 70 percent, titanium is present in an atomic percentage ranging between about 10 percent and about 30 percent, and the third metal is nickel and is present in an atomic percentage ranging between about 1 percent and about 20 percent.

22. The fuel cell assembly according to claim 21, wherein the third metal is vanadium and is present in an atomic percentage ranging between about 1 percent and about 20 percent.

23. The fuel cell assembly according to claim 20, wherein platinum is present in an atomic percentage ranging between about 55 percent and about 70 percent, titanium is present in an atomic percentage ranging between about 15 percent and about 20 percent, and the third metal is copper and is present in an atomic percentage ranging between about 10 percent and about 25 percent.

24. The fuel cell assembly according to claim 20, wherein platinum is present in an atomic percentage ranging between about 60 percent and about 80 percent, titanium is present in an atomic percentage ranging between about 10 percent and about 20 percent, and the third metal is manganese and is present in an atomic percentage ranging between about 10 percent and about 25 percent.

25. The fuel cell assembly according to claim 20, wherein platinum is present in an atomic percentage ranging between about 60 percent and about 75 percent, titanium is present in an atomic percentage ranging between about 5 percent and about 25 percent, and the third metal is cobalt and is present in an atomic percentage ranging between about 10 percent and about 25 percent.

26. The fuel cell assembly according to claim 20, wherein platinum is present in an atomic percentage ranging between about 50 percent and about 65 percent, titanium is present in an atomic percentage ranging between about 15 percent and about 25 percent, and the third metal is palladium and is present in an atomic percentage ranging between about 10 percent and about 30 percent.

27. The fuel cell assembly according to claim 20, wherein the electrocatalyst comprises a thin film electrocatalyst.

* * * * *